United States Patent [19]
Fujiki et al.

[11] 4,208,658
[45] Jun. 17, 1980

[54] RADAR-OPERATED VEHICLE SAFETY ASSURANCE SYSTEM

[75] Inventors: Norio Fujiki; Kousaku Baba, both of Yokohama; Akitoshi Mimura, Tokorozawa, all of Japan

[73] Assignee: Nissan Motor Company, Limited, Yokohama, Japan

[21] Appl. No.: 954,853

[22] Filed: Oct. 26, 1978

[30] Foreign Application Priority Data

Oct. 27, 1977 [JP] Japan ............................ 52/128140

[51] Int. Cl.² ............................................. G01S 9/02
[52] U.S. Cl. ............................................. 343/7 VM
[58] Field of Search ................................. 343/7 VM

[56] References Cited
U.S. PATENT DOCUMENTS

| 3,824,592 | 7/1974 | Mehltretter | 343/7 VM X |
| 3,984,836 | 10/1976 | Oishi et al. | 343/13 R |
| 4,001,823 | 1/1977 | Matsui et al. | 343/7 VM X |
| 4,073,359 | 2/1978 | Fujiki et al. | 343/7 VM X |

Primary Examiner—T. H. Tubbesing
Attorney, Agent, or Firm—Lowe, King, Price & Becker

[57] ABSTRACT

A radar-operated vehicle safety assurance system includes a radar device which detects the vehicle relative speed or range to an object. A safety limit value of the detected operating parameter is computed by means of a safety range detection or safety speed detection circuit as a function of a detected operating parameter. A visual indicator is provided which visually indicates the difference between the detected value and the computed safety limit value to allow the vehicle driver to become continuously aware of the marginal conditions of the vehicle in relation to the safety limit.

18 Claims, 21 Drawing Figures

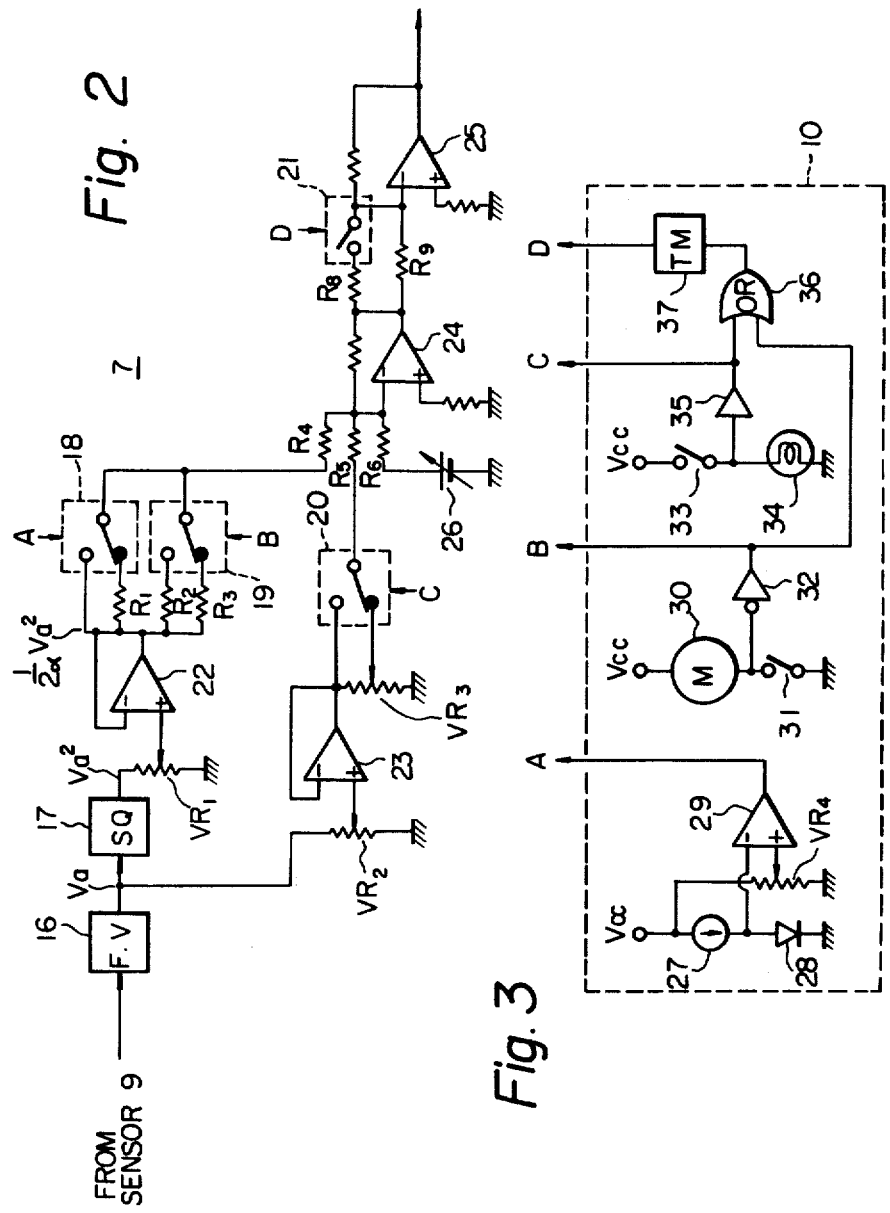

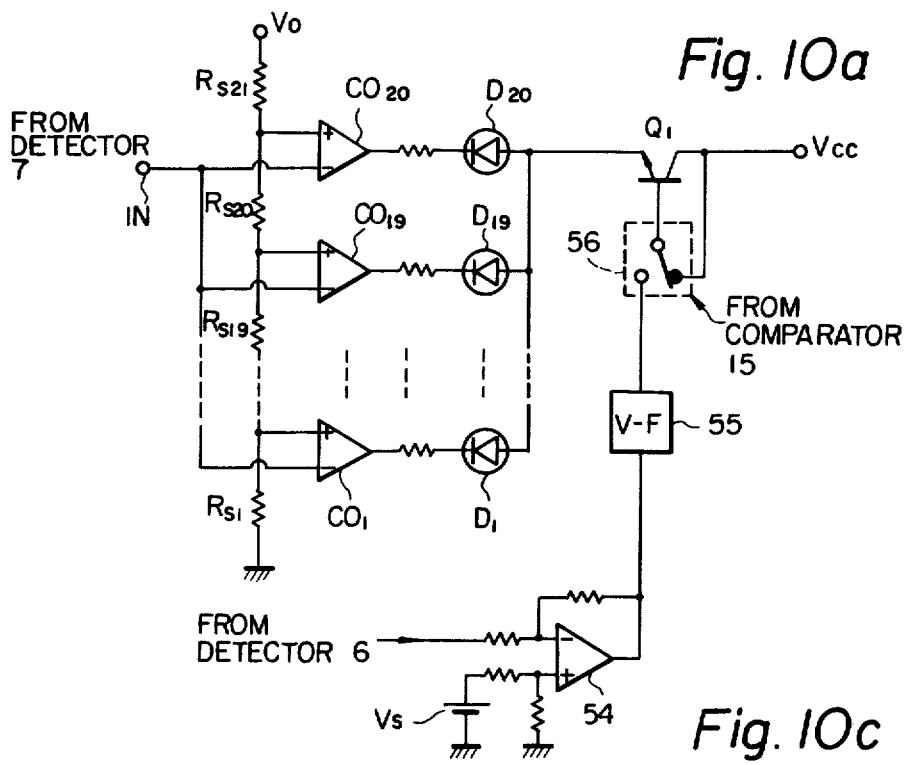
*Fig. 10a*
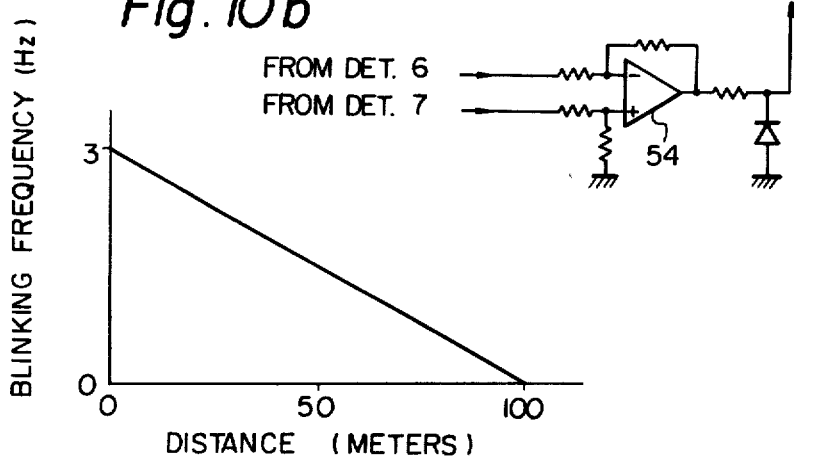
*Fig. 10b*
*Fig. 10c*

RADAR-OPERATED VEHICLE SAFETY ASSURANCE SYSTEM

BACKGROUND OF THE INVENTION

The present invention relates to a radar-operated vehicle safety assurance system in which the difference between the distance to or relative speed to an object and a safety limit value is visually indicated on the instrument panel to advise the vehicle driver of the allowance of the vehicle with regard to alarming conditions.

With conventional radar-operated vehicle safety assurance systems, warning signals are given when the vehicle approaches an object within a safety range established relative thereto as a function of a set of detected operating parameters, so that the driver is alerted to take necessary actions. However, the vehicle driver is not given information as to the status of the own vehicle relative to the target vehicle until the alarming condition has reached that justifies the issurance of warning signals. It is often desirable to indicate the operating parameters of the vehicle, such as relative speed to an object or distance thereto, in relation to a parameter which is the limit of safety speed or distance to the object.

SUMMARY OF THE INVENTION

The invention is directed to a system in which one of the range or distance to an object and the relative speed thereto, is detected by a radar device to serve as the operating parameter of the vehicle representing the vehicle status in relation to the object. A safety limit range or relative speed is computed as a function of a detected operating parameter. A visual indicator is provided to indicate the difference between the detected operating parameter and the computed safety limit value.

An object of the present invention is therefore to visually indicate a marginal operating parameter of the vehicle in relation to a safety limit derived as a function of a detected operating parameter, so that the vehicle driver becomes continuously aware of the status of the own vehicle in relation to a target vehicle.

BRIEF DESCRIPTION OF THE DRAWINGS

The invention will be further described by way of example with reference to the accompanying drawings, in which:

FIG. 2 illustrates details of the safety range detection circuit of FIG. 1;

FIG. 3 illustrates details of the compensator of FIG. 1;

FIGS. 10a and 10c are circuit diagrams for driving the light-emitting diodes of FIG. 9, and FIG. 10b is a graphic illustration showing the relation between blinking frequency as an inverse function of the detected distance to the object;

DETAILED DESCRIPTION

Figure 1:
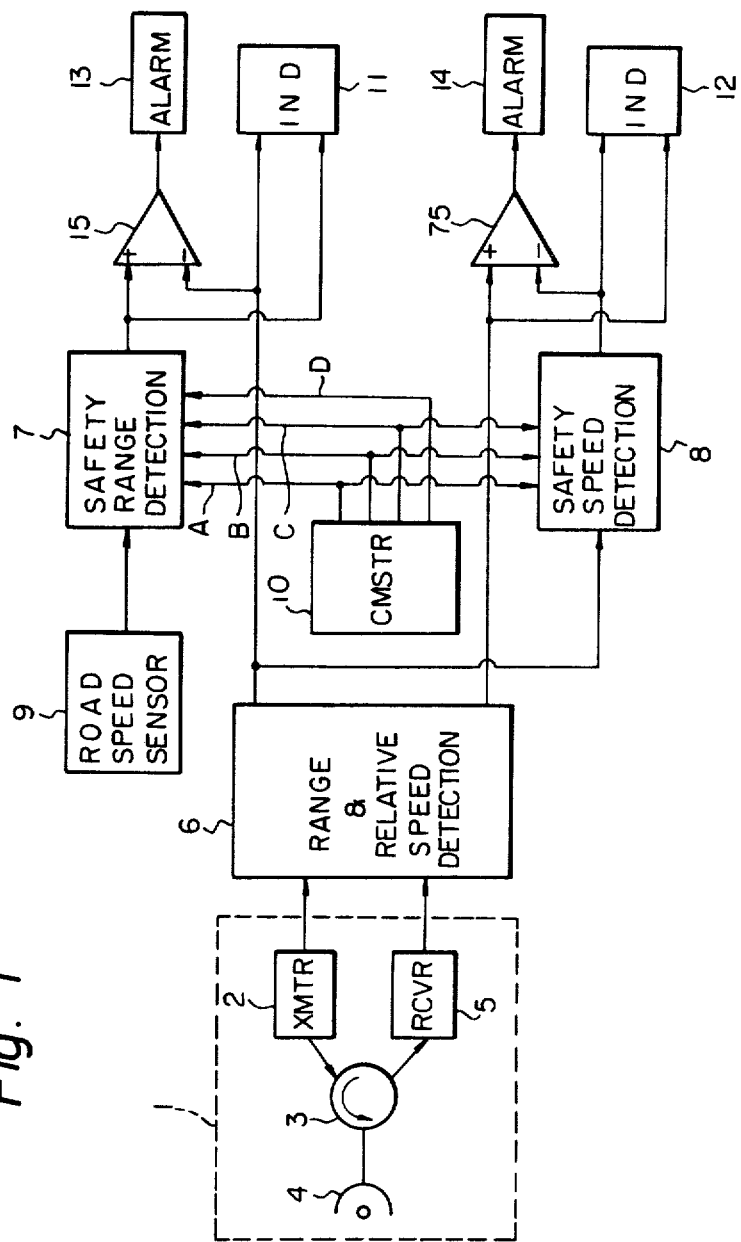
FIG. 1 is a schematic block diagram of the radar-operated vehicle safety assurance system of the invention.

Referring now to the drawings, in particular to FIG. 1, a radar-operated vehicle speed and range detection system embodying the invention is illustrated in schematic form as comprising a radar transmit/receive unit 1 including a transmitter 2 and a receiver 5 both of which are connected to a circulator 3 through which the signal from the transmitter is passed to an antenna 4 for transmission to an object and a return signal from the object is received thereat and passed through the circulator to the receiver 5. The signals from the transmitter and receiver are applied to a range and relative speed detector 6 to determine the vehicle's range relative speed to that object in a conventional manner and deliver corresponding signals to visual indicators 11 and 12, respectively, for purposes of displaying the instantaneous value of these signals.

In order for the system to permit the vehicle driver to visually compare said instantaneous values with safety limit values, the indicators 11 and 12 are also supplied with signals from a safety range detector 7 and from a safety speed detector 8, respectively. The safety range detector 7 is supplied with signals from a road speed sensor 9 in response to the vehicle's speed relative to the roadway surface and correction signals from a compensator 10 in response to vehicle's environmental conditions. The safety speed detector 8 is in receipt of signals from the detector 6 indicating the instantaneous value of the vehicle's range to the object and also in receipt of correction signals from the compensator 10. This detector determines the safety limit of the speed relative to an object vehicle running at a constant speed in contemplation of a maximum deceleration of the own vehicle to avoid collision against the object vehicle.

The safety limit of the detected vehicle's range to the object is also supplied to a comparator 15 for comparison with the instantaneous value of the range to trigger an alarming device 13 when the safety value is reached. In a similar manner, the safety limit of the detected vehicle's relative speed to the object is applied to a comparator 75 for comparison with the instantaneous value of the vehicle's relative speed to trigger an alarming device 14 when the safety speed value is reached.

The safety range limit varies from instant to instant depending on deceleration rate, roadway speed, driver's response time and a predetermined safety distance to the object when the vehicle finally comes to a stop. The safety range Rs is mathematically given by the following relation:

$$R_s = 1/(2a)V_a^2 + T_d \cdot V_a + M \qquad (1)$$

where, α is the deceleration rate represented as a function of friction between the surfaces of roadway and the tires, Va is the vehicle's roadway speed (meters/sec), Td, the driver's delay time in response to external stimuli, and M, the distance to the object when the own vehicle comes to a stop.

Referring to FIG. 2 wherein details of the safety range detector 7 are illustrated. The detector 7 is shown as comprised of a frequency-to-voltage converter 16 wherein the received speed-indicating pulses from the speed sensor 9 are converted into a corresponding voltage signal, which signal is applied to a squaring circuit 17 to derive an output signal representing $Va^2$ which is grounded through a variable resistor $VR_1$ to scale down the signal by a factor of $\frac{1}{2}\alpha$. Therefore, a voltage signal $(\frac{1}{2}\alpha)Va^2$ is applied to a unity-gain buffer amplifier 22 whose output is coupled to a switched resistor network including resistors $R_1$, $R_2$ and $R_3$ switching circuits 18 and 19 and thence to a summing amplifier 24 via a resistor $R_4$. The output from the frequency-to-voltage converter 16 is also coupled to ground through a variable resistor $VR_2$ to scale down the signal Va by a factor representing Td. The scaled-down voltage Va·Td is coupled through a unity-gain buffer amplifier 23 to a switched resistor network including a variable resistor $VR_3$ and a switching means 20 whose output is coupled to the summing amplifier 24 via a resistor $R_5$. A DC voltage source 26 representing the safety distance M is coupled to the summing amplifier 24 through a resistor $R_6$. The output of the summing amplifier 24 is connected to a unity-gain buffer amplifier 25 by a switched resistor network including resistors $R_8$ and $R_9$ and a switch 21. The switching circuits 18, 19, 20 and 21 are operable to respond to output signals from the compensator 10 to change the scale-down rate as described below.

As shown in FIG. 3, the compensator 10 includes a diode 28 which is, in effect, a temperature sensor to develop a corresponding voltage signal to a comparator 29. A constant-current source 27 supplies a current to the diode 28 from voltage source Vcc. The comparator 29 compares the temperature representing voltage with a reference established by a variable resistor $VR_4$ and provides an output when temperature outside of the vehicle falls below the freezing point. This output signal is applied over a conductor A to the switching circuit 18. The switching circuit 18, which normally couples the buffer amplifier 22 output through resistor $R_1$ to the summing amplifier 24, changes its switching path so that the buffer amplifier 22 output is directly coupled to the summing amplifier so that the α value is decreased to a lower value when the temperature is below freezing point. A switch 31 is connected to a motor 30 which drives the windshield wiper during the rainy condition. When the switch 31 is activated, a low level voltage is coupled to an inverter 32 and applied through a conductor B to the switching circuit 19, which normally couples the buffer amplifier 22 output through the resistor $R_3$ having a higher resistance than resistor $R_2$ to the summing amplifier 24, to change its switching path to the resistor $R_2$ to decrease the α value during the rainy condition. During night driving a switch 33 is manually activated to light up the tail or head lamps 34. The operation of switch 33 is sensed by a buffer amplifier 35 and is coupled through a conductor C to the switching circuit 20, which normally couples the voltage at the slider of potentiometer $VR_3$ to the summing amplifier 24, to change its switching path so that the output from the buffer amplifier 23 is directly coupled to the summing amplifier 24, thus providing a larger Td value than during daytime driving.

The output from the buffer amplifier 35 and the inverter 32 are coupled through an OR gate 36 to a timing circuit 37 which provides an output pulse for a predetermined duration in response to each of the input signals to the OR gate 36. The output of the timing circuit 37 is coupled over a conductor D to the switching circuit 21. The latter is normally open to allow the output of the summing amplifier 24 to be coupled via resistor $R_9$. In response to the output from the timing circuit 37, the switching circuit 21 connects the resistor $R_8$ in a parallel circuit with the resistor $R_9$ so that the resultant value of resistance to the input of the buffer amplifier 25 is lowered. The reason for this is to increase the amplitude of the output signal Rs so as to increase the safety limit range for a certain interval to compensate for an increased likelihood of accidents during transient periods such as at dusk and at times when weather changes from fair to rain.

As described previously, the radar-equipped vehicle can approach an object in front without the possibility of collision if the relative speed to the object is maintained below the safety limit. The safety relative speed Vr is obtained by rearranging Equation 1 as follows:

$$Vr = \frac{-Td + \sqrt{Td^2 - 4a(M - R)}}{2a} \quad (2)$$

where, $a = \frac{1}{2}\alpha$, and R represents the distance to the object in front. Equation 2 signifies that, after the elapse of a delay response time Td, the own vehicle when decelerated at the rate α will approach the object with a safety distance M thereto.

Figure 4:
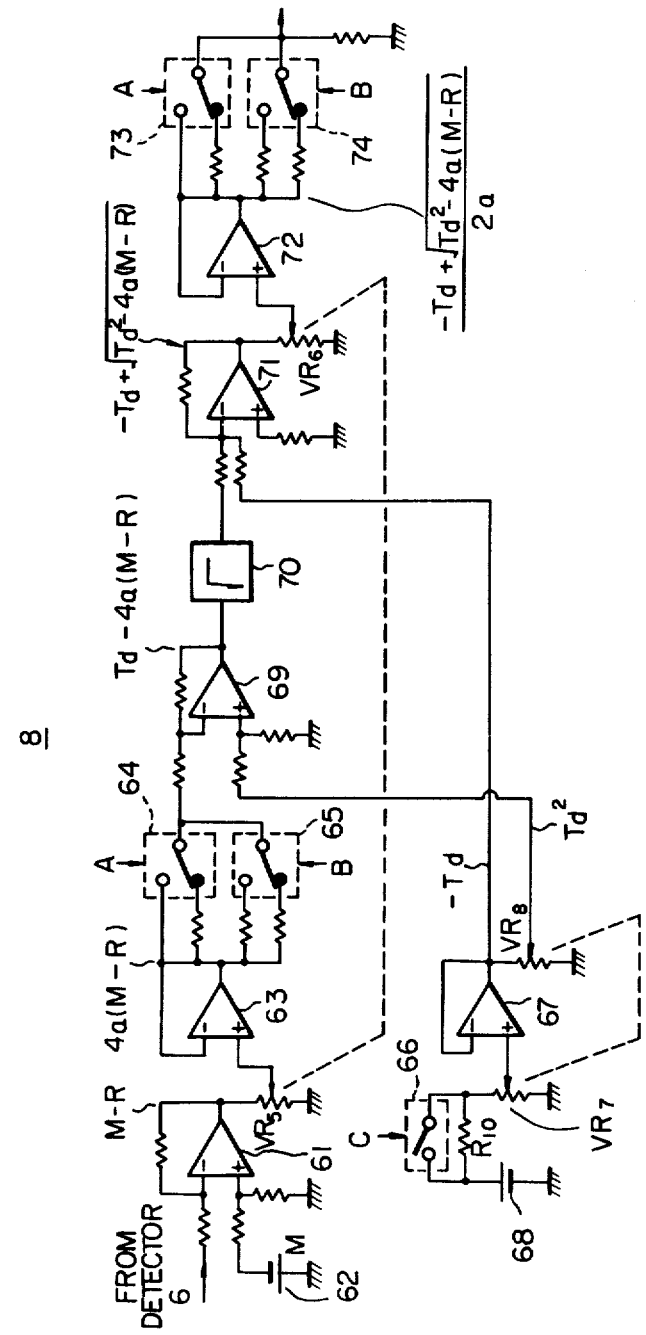
FIG. 4 is an illustration of details of the safety speed detection circuit of FIG. 1.

FIG. 4 is an illustration of the details of the safety speed detector 8 of FIG. 1. The range signal from the detector 6 is applied to a differential amplifier 61 to derive a differential output signal representing the difference between the instantaneous value of the distance to the object in front and the safety distance M to that object represented by voltage from a source 62 and feeds the differential output to a scaling circuit formed by a variable resistor $VR_5$ to provide a proportioned voltage to a unity-gain buffer amplifier 63 whose output is connected to a switched resistor network similar to that described above including switching circuits 64 and 65 in response to signals over conductors A and B, respectively. The variable resistor $VR_5$ proportions the input voltage by a factor of 4a so that the amplifier 63 output is $4a(M - R)$, which is further modified in amplitude by the corrective signals supplied over conductors A and B from the compensator 10 referred to previously.

A voltage representing the delay time Td is provided at the slider terminal of a variable resistor $VR_7$ which is coupled in series with a resistor $R_{10}$ to a DC voltage source 68, the potential at the slider terminal being applied to a buffer amplifier 67 whose output is coupled to ground through a variable resistor $VR_8$ to derive a voltage equal to $Td^2$ at the slider terminal of the latter for application to the noninverting input of a differential amplifier 69, wherein the signal $Td^2$ is algebraically combined with the output from the switched network 64, 65 applied to the inverting input to derive a differential output representing $Td^2 - 4a(M - R)$. This voltage signal is applied to a square root circuit 70 which gives a square root of the input signal and feeds its output to a summing amplifier 71. A normally open switch 66 is connected in parallel with the resistor R10 to provide a short-circuit path thereacross in response to a signal on conductor C to vary the Td value.

The voltage at the output of buffer amplifier 67 is $-Td$ which is applied to the summing amplifier 71 to be algebraically added to the square-root output to provide a voltage $-Td+\sqrt{Td^2-4a(M-R)}$, which is proportioned by means of a variable resistor $VR_6$ by a factor of $\frac{1}{2}a$ in association with the variable resistor $VR_5$ as indicated by a broken line. This proportionality factor is varied by means of a buffer amplifier 72 and a switched resistor network including switching circuits 73 and 74 which are responsive to the corrective signals supplied over conductors A and B, respectively.

Figure 5:
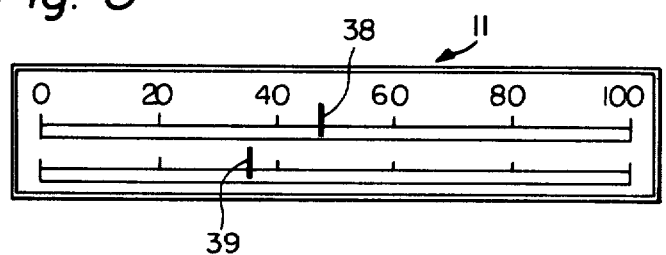
FIG. 5 is an illustration of a visual range indicator.

After the description of the detectors 7 and 8 now follows the description of the construction of the indicator 11 illustrated in FIGS. 5 to 13b. The indicator 11 shown in FIG. 5 is of a horizontally movable type having a pair of identical pointers 38 and 39, with the pointer 38 being responsive to the instantaneous range signal from the range detection circuit 6 and the pointer 39 being responsive to the voltage signal from the safety range detection circuit 7. Each of the pointers is arranged to move across the horizontal parallel scales indicating distances to an object of interest from zero to 100 meters. When the instantaneous value as indicated by the upper pointer 38 is positioned rightwardly of the lower pointer 39, there is a certain degree of allowance to the safety limit and the driver is made aware of the allowance by inspecting the difference in distance between the two pointers. If the upper pointer is moved to a position leftward of the lower pointer, alarm will be automatically triggered in response to an output from the comparator 15 to warn the driver against danger.

Figure 6A:
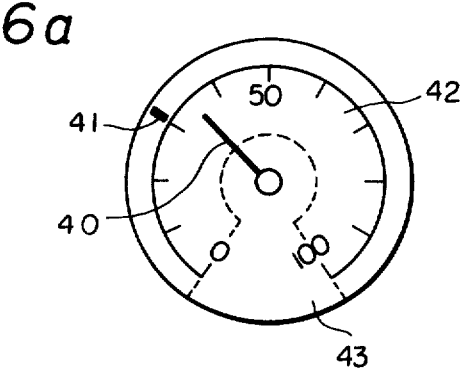
FIGS. 6a and 6b are plan and cross-sectional views respectively of a modification of the visual indicator.
Figure 6B:
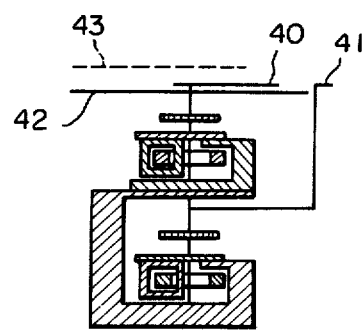

Alternatively, a circular type indicator as illustrated in FIG. 6a may also be employed in which the instantaneous range value is indicated by an inner pointer 40 and the safety limit value is indicated by an outer pointer 41 both of which are coaxially pivoted as shown in FIG. 6b. A masking plate 43 may be provided on the scale 42 to mask a portion of the scale so that when the object is far ahead of the radar detection range, 100 meters, for example, the pointer 40 may be hidden behind the masking plate 43 to prevent the driver from being confused since under such conditions the pointer 40 may dwell at a point indeterminate within the area covered by the mask 43.

Figure 7:
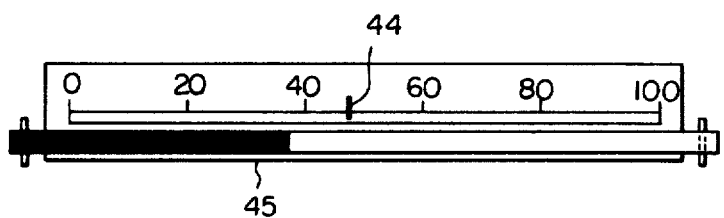
FIG. 7 is an illustration of a further modified form of the visual indicator.

FIG. 7 is a further alternative arrangement in which the instantaneous range value is indicated by an upper pointer 44 and the safety limit value is indicated by the length of a colored (red) horizontally movable band 45. The band 45 is attached at one end to a coiled spring (not shown) to be retracted in a leftward position and drawn out to the right in proportion to the current supplied to a moving magnetic coil (not shown). This arrangement serves to facilitate recognition of the difference between the two indications.

Figure 8A:
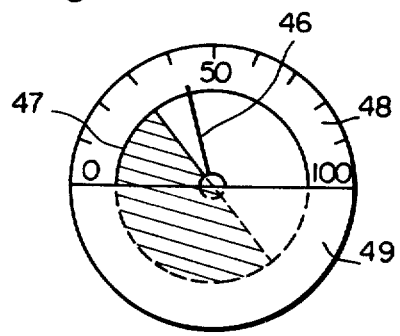
FIGS. 8a and 8b are plan and cross-sectional views of a further modification of the visual indicator.
Figure 8B:
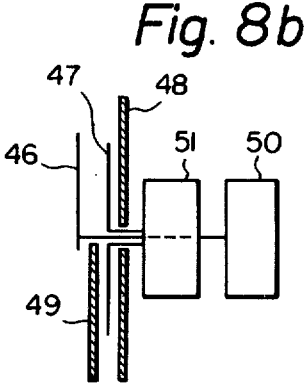

In the modification of FIGS. 8a and 8b, the pointer 46 is driven by a motor 50 to indicate the instantaneous range value, while the sector 47, which is coaxially pivoted with the pointer 46, is driven by a motor 51 to indicate the safety range limit. The sector 47 is painted with an attractive color and normally hidden behind a semi-circular mask 49 and arranged to rotate clockwise in proportion to the current that drives the motor 51. The scale 48 appears on the upper half circle of the meter.

Figure 9:
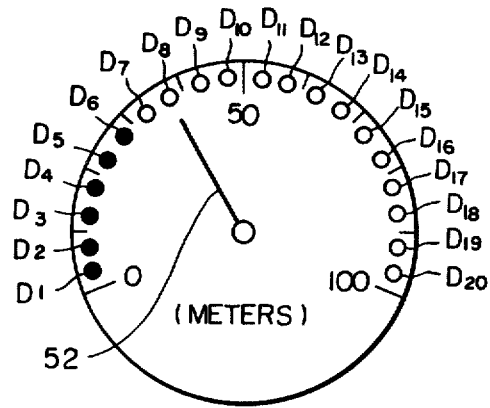
FIG. 9 is an illustration of another visual indicator in which light-emitting diodes are employed.

FIG. 9 is another example in which a plurality of light-emitting diodes (LED) D1 to D20 are arranged on a portion of the circumference of a circular disc to indicate the safety limit value by the number of energized LED's and the pointer 52 indicate the instantaneous value. FIG. 10a is an illustration of a circuit that drives the LED's D1 to D20. Comparators $CO_1$ to $C_{20}$ have their inverting inputs connected together to the output terminal of the safety range detection circuit 7 and their noninverting inputs connected to corresponding points of a voltage divider formed by resistors Rs1 to Rs21 in series between a voltage source and ground. In proportion to the voltage applied to the terminal IN the number of comparators increase as the voltage at the noninverting inputs exceeds each of the reference voltages. The output terminals of the comparators are connected to one end of the light-emitting diodes whose other ends are connected together to the emitter of a transistor Q1 whose base and collector electrodes are interconnected via a normally closed contacts of a relay 56, the collector of the transistor Q1 being connected to a voltage supply Vcc so that the transistor is normally turned on to supply current to the diode array. The comparators provide a low level voltage whenever the input signal exceeds the reference potential so as to draw current through transistor Q1 and through the corresponding LED's. The relay 56 is connected to be responsive to the output from the comparator 15, which is described previously to energize the alarm 13, to open the circuit between the base and collector of transistor Q1 and connect its base to the output of a voltage-to-frequency converter 55 whose input is connected to the output of a differential amplifier 54. This differential amplifier is in receipt of the instantaneous value of the range signal from the range detection circuit 6 at the inverting input for comparison with a reference voltage supplied from a voltage source Vs to provide a differential output. This comparator serves as a subtractor in which the reference voltage is subtracted by the voltage at the inverting input so that with an increase in range detection signal the output voltage of the comparator 54 decreases. Therefore, the frequency of the converter 55 varies as an inverse function of the instantaneous value of the detected vehicle range to the object. When the vehicle approaches an object the frequency of the converter 55 increases and when the instantaneous range value falls below the safety limit the comparator 15 will deliver a warning signal, which triggers the relay 56 so that the transistor Q1 and therefore LED's are caused to turn on and off at the frequency of the converter 55. This blinking action serves to attract the driver's attention to quickly take necessary action to avoid collision. Experiments showed that the blinking frequency of the light-emitting diodes which is most attractive to the human eyes is found to lie between 120 to 180 repetitions per minute (which is equal to 2 to 3 Hz). Preferably, the circuit is so designed that the voltage-to-frequency converter which is, in effect, a conventional voltage-controlled oscillator, generates a signal at 3 Hz when the distance to the object is near zero and which signal linearly decreases in frequency as the distance increases so that at the limit of the radar detection range the blinking frequency is near zero (FIG. 10b). Thus, the alarming rate becomes higher as the vehicle approaches near the object.

The circuit of FIG. 10a is modified as shown in FIG. 10c in which the comparator 54 is arranged to compare the range signal from detector 6 with the safety limit signal supplied from the safety limit detection circuit 7 so that the blinking frequency is proportional to the amount by which the vehicle has exceeded the safety limit distance.

Figure 11:
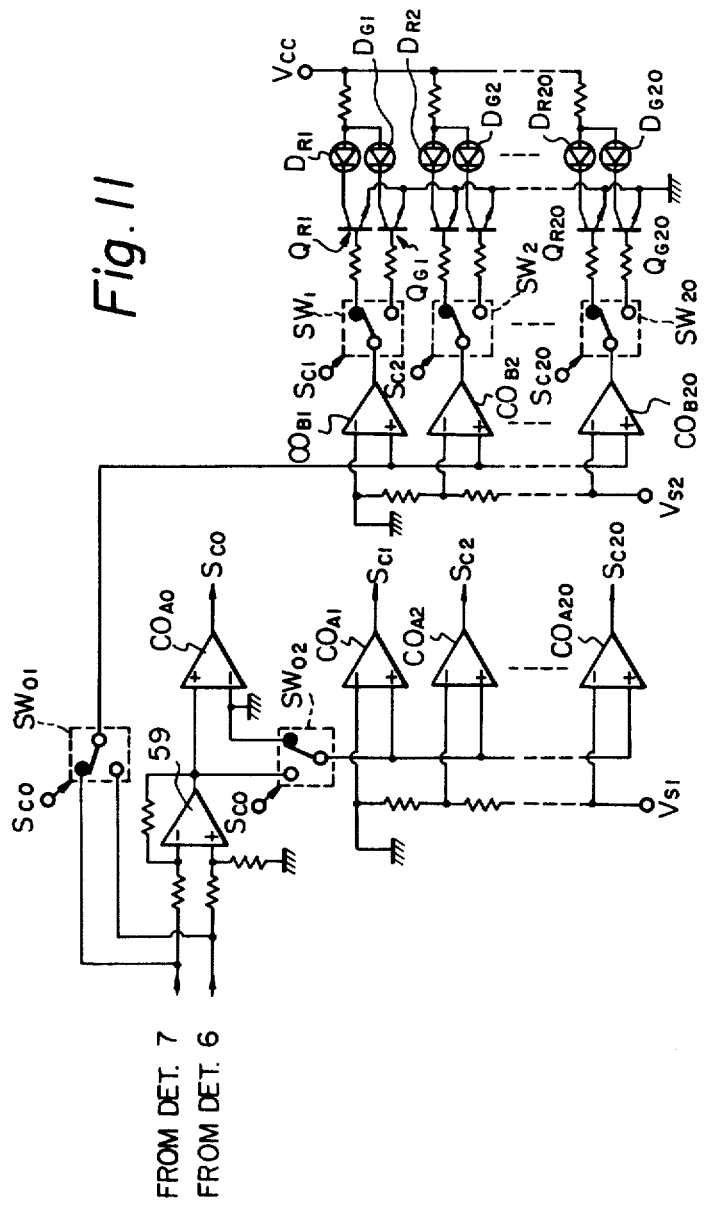
FIG. 11 is a circuit diagram for driving an array of light-emitting diodes.

The embodiment shown in FIGS. 11 and 12 involves the use of different colors for indicating the difference between the actual and safety ranges. In FIG. 11, a differential amplifier 59 is provided to compare the signals from the safety range detector 7 and the actual range detector 6 and delivers a signal representing the difference therebetween to the noninverting input of a comparator $CO_{AO}$ whose inverting input is connected to ground. The latter provides a logic "1" output when the actual range is greater than the safety limit range and applies its output to a terminal $S_{CO}$ to energize relays $SW_{01}$ and $SW_{02}$. The relay $SW_{01}$, which normally couples the signal from the safety range detector 7 to the noninverting input terminals of comparators $CO_{B1}$ to $CO_{B20}$, changes its switching paths in response to the output from the comparator $CO_{AO}$ to couple the signal from the actual range detector 6 to those comparators. The relay $SW_{02}$, which under normal conditions connects the noninverting input terminals of comparators $CO_{A1}$ to $CO_{A20}$ to ground, changes its switching paths in response to the output from the comparator $CO_{AO}$ to couple those noninverting input terminals to the output of the differential amplifier 59. To the inverting input terminals of the comparators $CO_{A1}$ to $CO_{A20}$ are connected different reference potentials provided by a voltage divider connected between a voltage source VS1 and ground. Likewise, the inverting input terminals of the comparators $CO_{B1}$ to $CO_{B20}$ are connected to different potentials as described above by means of a voltage divider connected between voltage source VS2 and ground. Each inverting input of the comparators $CO_{A1}$ to $CO_{A20}$ is biased at a potential difference which corresponds to a distance of 5 meters so that for each increment of the difference output from the differential amplifier 59 there is produced from the output of the corresponding comparator a logic "1". The output terminals of the comparators $CO_{A1}$ to $CO_{A20}$ are connected through terminals $S_{C1}$ to $S_{C20}$ to relays $SW_1$ to $SW_{20}$ which are in turn connected to the outputs of comparators $CO_{B1}$ to $CO_{B20}$ to pass, under normal conditions, the output signals therefrom to the base electrodes of transistors $Q_{R1}$ to $Q_{R20}$, respectively, for emission of red light. The collector electrodes of these transistors are connected respectively to one terminal of LED's $D_{R1}$ to $D_{R20}$ for emission of red light. The relays $SW_1$ to $SW_{20}$ change their switching paths to connect the outputs from the comparators $CO_{B1}$ to $CO_{B20}$ to the base electrodes of transistors $Q_{G1}$ to $Q_{G20}$ in response to the control signals supplied from the outputs of comparators $CO_{A1}$ to $CO_{A20}$. A set of LED's $D_{G1}$ to $D_{G20}$ is provided which are respectively connected to the collectors of transistors $Q_{G1}$ to $Q_{G20}$ for emission of green light. The emitters of all the transistors are connected in common to ground to act as an amplifier stage for the corresponding light-emitting diodes.

Figure 12A:
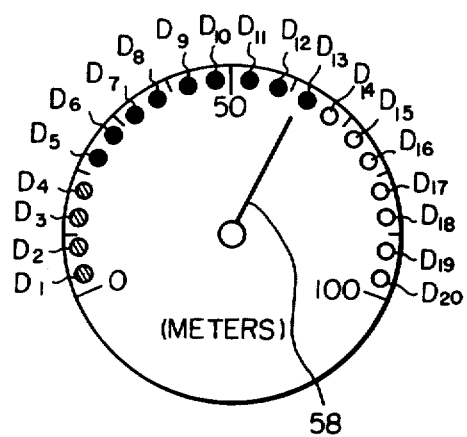
FIGS. 12a and 12b are illustrations of a visual indicator with an array of light-emitting diodes driven by the circuit of FIG. 11, indicating different conditions.
Figure 12B:
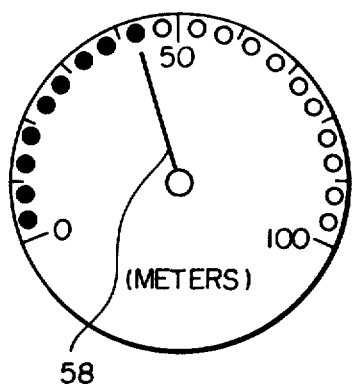

Operation of the circuit of FIG. 11 may be visualized as follows. When the actual range is greater than the safety limit, the differential signal from the comparator 59 is applied to the comparators $CO_{A1}$ to $CO_{A20}$ and the signal representing the actual range is supplied to the comparators $CO_{B1}$ to $CO_{B20}$ so that one or more of transistors $Q_{G1}$ to $Q_{G20}$ will be energized to supply currents to corresponding ones of LED's $D_{G1}$ to $D_{G20}$ in response to the actual range signal exceeding the corresponding reference potential so that the vehicle driver is given green light indications. If it is assumed that in certain of comparators $CO_{A1}$ to $CO_{A20}$ when the difference signal exceeds the corresponding reference levels, corresponding ones of relays $SW_1$ to $SW_{20}$ will be activated to switch the indication from green to red so that LED's $D_5$ to $D_{13}$ switch from green to red as indicated by black dots, FIG. 12a, while LED's $D_1$ to $D_4$ remain activated to emit green light as indicated by shaded dots when the vehicle's actual distance to the object is approximately 60 meters from the object as indicated by a pointer 58. As the vehicle's distance to the object decreases with time the lighted LED's will be shifted counterclockwise, so that when the actual distance reaches the safety limit all the green light LED's will be extinguished and the LED's to $D_1$ to $D_9$ will emit red light as indicated in FIG. 12b. Under these conditions, the output of the comparator 59 is turned off to connect ground potential to the noninverting input of all the comparators $CO_{A1}$ to $CO_{A20}$ so that all of the relays are caused to switch their paths to normal positions, and as a result only the red-light LED's are allowed to be activated to indicate the safety limit value.

Since the pointer 58 is designed to indicate the actual distance to the object, and which always corresponds to the activated LED of the rightmost position, it will be appreciated that the pointer 58 may be dispensed with. The circuit may also be designed to light up LED's such that the green light is emitted in positions to the right of the positions where red light is emitted and with a decrease in actual distance to the object the number of green-light emitting diodes is extinguished stepwisely in counterclockwise direction.

Figure 13A:
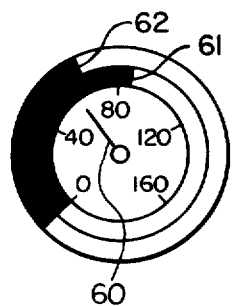
FIGS. 13a and 13b are illustrations of modified range indicators which are arranged on the periphery of a conventional speedometer of the vehicle.
Figure 13B:
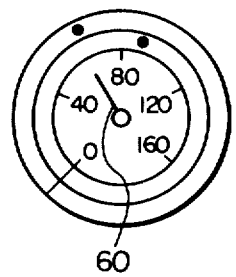

For the purposes of utilizing the restricted space within the vehicle, the above described indicators may be mounted such that the actual and safety distances to the object are indicated on the circumference of the conventional speedometer as illustrated in FIG. 13a. The inner band 61 indicates the actual distance and the outer band 62 the safety limit distance, with the pointer 60 of the speedometer located in the center of the meter. Instead of the band representation, the distance representation is effected alternatively by dot representation as shown in FIG. 13b.

Figure 14:
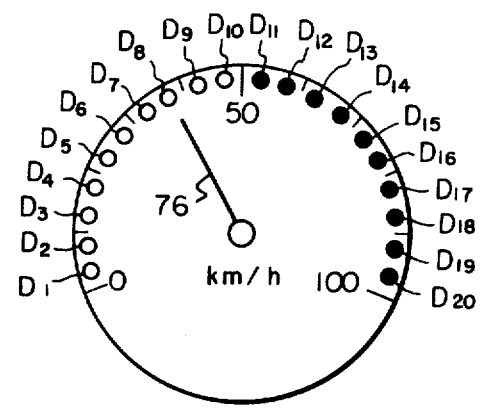
FIGS. 14 and 15 are illustrations of a visual indicator and a circuit for driving the same for relative speed indication.
Figure 15:
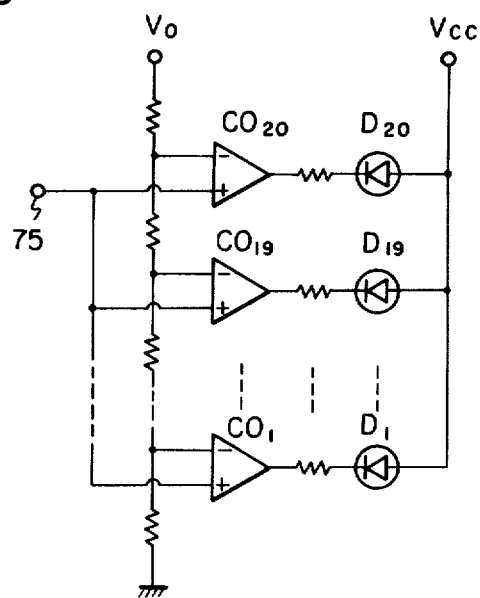

The indicator 12 may also be constructed in a manner similar to those described in connection with the previous embodiments. FIG. 14 shows an example which is similar in construction to that described with reference to the FIG. 9 embodiment. As illustrated in FIG. 14, light-emitting diodes $D_{11}$ to $D_{20}$ are energized in response to the safety speed signal supplied from the detector 8. The circuit shown in FIG. 15 is to convert this signal into a set of signals for activating the LED's by comparing it with a set of reference levels in a manner similar to that described with reference to FIG. 10 except that the LED's are all connected together to a voltage source Vcc rather than via transistor Q1. With an increase in voltage at the input terminal 75 to which the safety limit speed signal is applied, LED's are lit in succession in counterclockwise direction beginning with LED $D_{20}$. When the indicator 12 is made to appear as shown in FIG. 14, the safety relative speed to the object is 50 kilometers per hour and the actual relative speed to that object is approximately 40 kilometers per hour. The pointer 76 is driven, of course, by a motor in response to the relative speed signal supplied from the relative speed detection circuit 6. The vehicle driver perceives the allowance to the safety limit by visual inspection of the position of the pointer 76 with respect to the leftmost position of the lit-up LED.

What is claimed is:

1. A vehicle safety assurance system comprising:
   a radar device for detecting an operating parameter of the vehicle relative to an object, said operating parameter including the distance from the vehicle to the object;
   means for continuously deriving a safety limit value of the operating condition of the vehicle relative to said object as a function of the detected distance or as a function of roadway speed of the vehicle; and
   means for visually indicating the difference between said safety limit value and said detected operating parameter.

2. A vehicle safety assurance system as claimed in claim 1, further comprising means for detecting the speed of the vehicle relative to the roadway, and wherein said deriving means includes safety range deriving means for deriving a safety distance from said vehicle to said object as a function of said roadway speed of the vehicle, and wherein said visual indicating means is responsive to the difference between said safety distance and said distance detected by said radar device.

3. A vehicle safety assurance system as claimed in claim 2, wherein said safety range deriving means comprises a computing circuit operable to compute an equation $(\frac{1}{2}a)Va^2 + Td \cdot Va + M$, where $a$ represents the deceleration of said vehicle, Td represents the delay time of a vehicle driver in responding to an external stimulus, and M is a constant representing a predetermined distance from said vehicle to said object.

4. A vehicle safety assurance system as claimed in claim 3, further comprising means for correcting one or more of said deceleration and said delay time in response to changes in human and environmental conditions of said vehicle.

5. A vehicle safety assurance system as claimed in claim 1 or 2, wherein said radar device includes relative speed detecting means for detecting the speed of the vehicle relative to said object, and wherein said deriving means includes safety speed deriving means for deriving a safety relative speed of the vehicle to said object as a function of said distance detected by said radar device, and wherein said visual indicating means is responsive to the difference between said safety relative speed and said relative speed detected by said relative speed detecting means.

6. A vehicle safety assurance system as claimed in claim 5, wherein said safety speed deriving means comprises a computing circuit operable to compute an equation $-a \cdot Td + a\sqrt{Td^2 - (2/a)(M-R)}$, where $a$ is the deceleration of said vehicle, Td represents the delay time of a vehicle driver in responding to an external stimulus, M is a constant representing a predetermined distance from said vehicle to said object and R represents the distance from said vehicle to said object detected by said radar device.

7. A vehicle safety assurance system is claimed in claim 6, further comprising means for correcting one or more of said deceleration and said delay time in response to changes in human and environmental conditions of said vehicle.

8. A vehicle safety assurance system as claimed in claim 1, wherein said visual indicating means comprises two pointers respectively movable along parallel scales in response to said safety limit value and said detected operating parameter.

9. A vehicle safety assurance system as claimed in claim 1, wherein said visual indicating means comprises a circular shaped meter having an part-circular shaped scale indicating a range from zero to a maximum value and a sector-shaped plate provided on the remainder of said meter not occupied with said part-circular shaped scale for making said pointer invisible when same is out of said scale.

10. A vehicle safety assurance system as claimed in claim 1, wherein said visual indicating means includes means for indicating said difference in the form of a sector.

11. A vehicle safety assurance system as claimed in claim 1, wherein said visual indicating means includes means for indicating said difference in the form of a band.

12. A vehicle safety assurance system as claimed in claim 1, wherein said visual indicating means comprises a plurality of light-emissive elements successively arranged on a scale and operable to emit light in response to one of said safety limit value and said detected operating parameter and a pointer movable across said scale in response to the other of said safety limit value and said detected operating parameter.

13. A vehicle safety assurance system as claimed in claim 12, wherein said visual indicating means includes means for periodically interrupting said emitted light when said operating parameter exceeds a predetermined value.

14. A vehicle safety assurance system as claimed in claim 12, wherein said visual indicating means includes means for interrupting said emitted light at a rate proportional to the difference between said safety limit and said operating parameter.

15. A vehicle safety assurance system as claimed in claim 1, wherein said visual indicating means includes a plurality of successively arranged light-emissive elements and means for activating said light-emissive elements in accordance with said difference so as to indicate same by the number of the activated elements.

16. A vehicle safety assurance system as claimed in claim 1, wherein said visual indicating means comprises a first set of successively arranged light-emissive elements for emission of a first color, a second set of successively arranged light-emissive elements for emission of a second color, each of the elements of the first set being arranged adjacent to each one of the elements of the second set, means for activating the elements of the first set in response to said difference and for activating the elements of the second set in response to said safety limit value such that the activated ones of the elements of the first and second sets are arranged in sequence along a scale.

17. A vehicle safety assurance system as claimed in claim 1, wherein said visual indicating means is arranged adjacent to the periphery of the scale of a speedometer of the vehicle.

18. A vehicle safety assurance system as claimed in claim 1, further comprising a comparator for comparing said safety limit and said operating parameter and audible indicating means for generating a sound signal in response to an output from said comparator when said operating parameter is equal to or greater than said safety limit value.

* * * * *